United States Patent
Kajikawa

(10) Patent No.: US 7,618,570 B2
(45) Date of Patent: Nov. 17, 2009

(54) PRODUCTION METHOD OF WEATHER STRIP FOR AUTOMOBILE

(75) Inventor: Shinichi Kajikawa, Hiroshima (JP)

(73) Assignee: Nishikawa Rubber Co., Ltd., Hiroshima-Shi (JP)

( * ) Notice: Subject to any disclaimer, the term of this patent is extended or adjusted under 35 U.S.C. 154(b) by 708 days.

(21) Appl. No.: 11/295,212

(22) Filed: Dec. 6, 2005

(65) Prior Publication Data

US 2006/0157885 A1    Jul. 20, 2006

(30) Foreign Application Priority Data

Jan. 20, 2005    (JP) ............................. 2005-013193

(51) Int. Cl.
| | |
|---|---|
| D01D 5/20 | (2006.01) |
| B29C 47/00 | (2006.01) |
| B28B 11/16 | (2006.01) |
| B32B 33/00 | (2006.01) |
| E06B 7/16 | (2006.01) |
| B32B 3/04 | (2006.01) |

(52) U.S. Cl. ................ 264/167; 264/138; 264/145; 264/154; 264/162; 264/171.26; 264/171.27; 264/173.11; 264/173.12; 264/209.3; 264/210.2; 264/236; 264/294; 264/296; 264/347; 156/244.18; 156/244.19; 156/250; 49/475.1; 428/122

(58) Field of Classification Search .................. None
See application file for complete search history.

(56) References Cited

U.S. PATENT DOCUMENTS

| | | | | |
|---|---|---|---|---|
| 3,923,576 | A | * 12/1975 | Lind | ..................... 156/244.18 |
| 6,143,397 | A | * 11/2000 | Kanehara | ..................... 428/192 |
| 2004/0043188 | A1* | 3/2004 | Tsujiguchi | ..................... 428/122 |
| 2004/0081796 | A1* | 4/2004 | Miyakawa et al. | .......... 428/122 |

* cited by examiner

*Primary Examiner*—Jeffrey Wollschlager
(74) *Attorney, Agent, or Firm*—Frishauf, Holtz, Goodman & Chick, P.C.

(57) ABSTRACT

There is provided a production method of a weather strip for an automobile, comprising a rubber-made installation base member 1 which embeds a plastic-made insert 4, and a holding lip 2 provided inside the groove portion 10, which comprises the following steps. An extrusion-molding process 101 wherein a whole weather strip 100 is integrally extrusion-molded in a state that a portion of a lid member 3 wider than an opening of the groove portion 10 is connected to an end portion of either side wall portion 12. A holding lip manufacturing process 102 wherein the holding lip 2 is processed by inserting a manufacturing tool 8 in the groove portion 10 through the opening. A lid closing process 103 wherein another portion of the lid member 3 is connected to the end portion of the other side wall portion 13 to cover the opening of the groove portion 10 with the lid member 3. A vulcanization process 104 wherein the weather strip 100 is vulcanized. And, a lid removing process 105 wherein the lid member 3 is removed from the side wall portions 12, 13.

2 Claims, 5 Drawing Sheets

PRODUCTION METHOD OF WEATHER STRIP FOR AUTOMOBILE

BACKGROUND OF THE INVENTION

This invention relates to a production method of a weather strip for an automobile, which is installed on an opening edge of an automobile body to seal a gap between the automobile body and an open-close member positioned in opposition to the automobile body by means of an elastic contact with the open-close member.

A comparative structure of a weather strip is illustrated in FIG. 8. This weather strip 200 is installed on an opening edge of an automobile body to conduct an elastic contact with an open-close member such as a door positioned in opposition to the automobile body in order to seal a gap between the body and the open-close member.

As illustrated in the sectional view in FIG. 8, the weather strip 200 for an automobile mainly comprises an installation base member 1 which is installed to an opening edge of an automobile body, a hollow seal member 5 which is integrally molded with the installation base member 1 for conducting the elastic contact with the open-close member such as the door positioned in opposition to the automobile body, and a lip member 6.

The installation base member 1 is composed of a bottom wall portion 11 and side wall portions 12, 13 each of which extends from a corresponding end edge of the bottom wall portion 11, forming a groove portion 10 which roughly forms an U shape in section. Further, there is provided a holding lip 2 inside the groove portion 10, which functions as a holding member when installing the installation base member 1 on the opening edge of the automobile body.

The each member described above is made of rubber.

Further, a metal made insert 7 is embedded inside the installation base member 1 in order to provide the installation base member with rigidity.

In this structure, a steel plate forming the opening edge of the automobile body on which the installation base member 1 is installed is not uniform in thickness but the thickness of the steel plate varies depending on portions of the opening edge in general. Therefore, when producing the weather strip 200 for an automobile, the holding lip 2 is subjected to a manufacturing process to correspond with the thickness variation of the steel plate.

This production method is performed by a process illustrated in FIG. 7.

In this production method, the whole weather strip 200 is formed by an extrusion-molding (Extrusion-molding process 201) first.

Secondly, the holding lip 2 is processed to vary its shape in accordance with a portion in a longitudinal direction by pushing the holding lip 2 toward a side of the side wall portion 13 or grinding the holding lip 2, after inserting a manufacturing tool 8 in the groove portion 10 of the installation base member 1 which has been extrusion-molded (Holding lip manufacturing process 202).

Lastly, the whole weather strip 200 is vulcanized (Vulcanization process 203).

By processing the holding lip 2 to correspond its shape with the thickness variation of the metal plate forming the opening edge of the automobile body, it is possible to install the weather strip 200 properly.

Besides the above-mentioned weather strip 200 for an automobile, in recent years, for the purposes of weight saving and recycling, there have been produced weather strips which comprise installation base members embedding plastic-made inserts such as thermoplastic resin instead of the metal-made inserts 7.

FIG. 9 is a sectional view showing a weather strip 300 for an automobile embedding a plastic-made insert 4 in an installation base member 1.

In such weather strip, the plastic-made insert 4 is lighter than the metal made insert 7, but the plastic-made insert 4 is softened by heat. Therefore, the weather strip 300 embedding such plastic-made insert 4 may deform in a vulcanization process.

In order to prevent the deformation, as illustrated in the sectional view in FIG. 9, it is possible to improve rigidity by integrally extrusion-molding a lid member 3 connecting both end portions of side wall portions 12, 13 and covering an opening of a groove portion 10. Then the lid member 3 can be removed after completion of vulcanization process.

However, if the opening of the groove portion 10 is covered with the lid member 3 as illustrated in FIG. 9, it is impossible to insert the manufacturing tool 8 into the groove portion 10 of the installation base member 1 after the extrusion-molding for processing a holding lip 2 because the lid member 3 interferes. Therefore, the process of adjusting the holding lip 2 in accordance with the thickness of the metal plate cannot be performed.

For such reasons, it is difficult to produce a weather strip comprising a plastic-made insert instead of a metal made insert by adjusting with a thickness variation of a metal plate forming an opening edge of an automobile body.

The invention is aimed at solution of the above-mentioned problem providing a production method in which the holding lip can be processed in accordance with thickness of the metal plate forming the opening edge of an automobile body in producing the weather strip for an automobile embedding the plastic-made insert in the installation base member.

SUMMARY OF THE INVENTION

In order to solve the above-mentioned problem, a first aspect of the invention provides a production method of a weather strip for an automobile, comprising a rubber-made installation base member (1) which embeds a plastic-made insert (4) and which is composed of a bottom wall portion (11) and side wall portions (12, 13) each of which extends from a corresponding end edge of the bottom wall portion (11) forming a groove portion (10) having a roughly U shape in section, and a holding lip (2) provided inside the groove portion (10), comprises the following steps.

An extrusion-molding process (101) wherein a whole weather strip (100) for an automobile is integrally extrusion-molded in a state that a portion of a lid member (3) formed wider than an opening of the groove portion (10) is connected to an end portion of either side wall portion (12) of the side wall portions (12, 13).

A holding lip manufacturing process (102) wherein the holding lip (2) thus extrusion-molded is processed by inserting a manufacturing tool (8) in the groove portion (10) through the opening.

A lid closing process (103) wherein another portion of the lid member (3) is connected to the end portion of the other side wall portion (13) of the side wall portions (12, 13) to cover the opening of the groove portion (10) with the lid member (3).

A vulcanization process (104) wherein the weather strip for an automobile (100) is vulcanized.

And, a lid removing process (105) wherein the lid member (3) is removed from the side wall portions (12, 13).

Further, a second aspect of the invention provides a production method of a weather strip for an automobile wherein connecting portions of the lid member (3) with the both side wall portions (12, 13) are thin-walled.

It should be noted that each numeral in parenthesis indicates a corresponding matter or corresponding item described in the after-mentioned best mode for carrying out the invention and the drawings.

According to the invention claimed in claim 1, in the extrusion-molding process in which the whole weather strip is integrally extrusion-molded, a portion of the lid member is connected to either one of the side wall portions, so that the opening of the groove portion after extrusion-molding is not closed by the lid member. Therefore, in the holding lip manufacturing process, the lid member does not become an interference, so that the holding lip after being extrusion-molded can be processed by inserting a manufacturing tool through the opening of the groove portion.

Further, in the lid closing process performed after the holding lip manufacturing process, another portion of the lid member is connected to the end portion of the other side wall portion to cover the opening of the groove portion, so that rigidity of the weather strip can be improved. Therefore, the weather strip is prevented from deformation in the vulcanization process.

Further, in the lid removing process, by removing the lid member from both of the side wall portions, a desired weather strip can be produced.

Moreover, according to the invention claimed in claim 2, in addition to the effects of the invention claimed in claim 1, the connecting portions of the lid member with both of the side wall portions are thin-walled, so that in the lid removing process, the lid member can easily be removed from the side wall portions.

Figure 9:
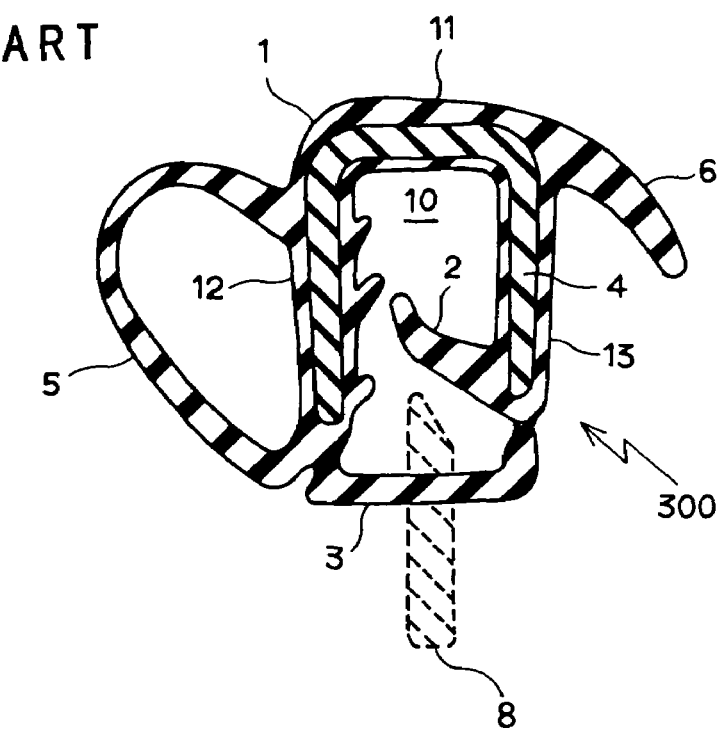

and, FIG. 9 is a sectional view showing a weather strip for an automobile according to a prior example.

DESCRIPTION OF PREFERRED EMBODIMENT

Referring to FIGS. 1 to 6, a production method of a weather strip 100 for an automobile according to an embodiment of the invention will be described.

Figure 1:
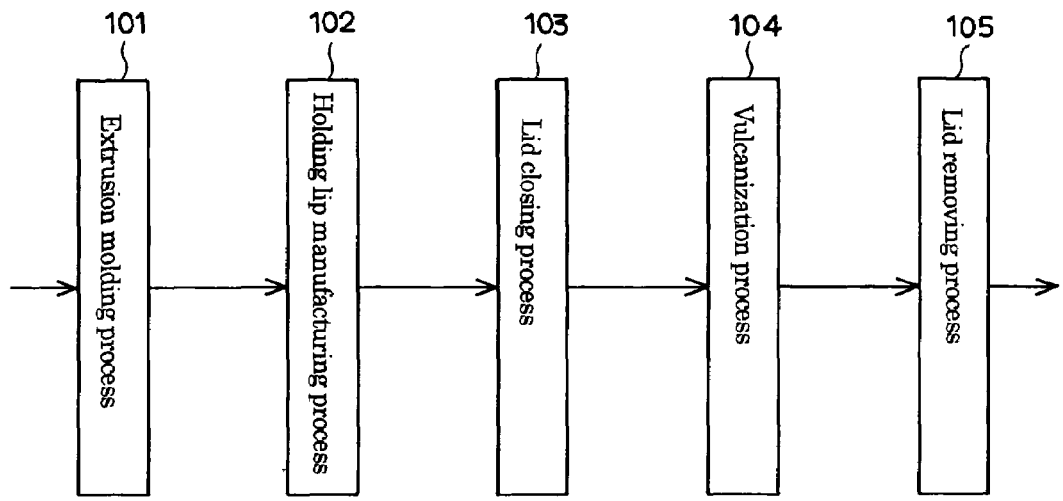
FIG. 1 is a flow chart showing a production method of a weather strip for an automobile according to an embodiment of the invention.

FIG. 1 is a flow chart showing the production method of a weather strip 100 for an automobile according the embodiment of to the invention. FIGS. 2 to 6 are sectional views of the weather strip 100 for an automobile in each process.

First, an extrusion-molding process will be described referring to FIG. 2.

The structure of the weather strip 100 extrusion-molded in an extrusion-molding process 101 is as follows.

The weather strip 100 comprises mainly an installation base member 1 mounted on an opening edge of an automobile body, a hollow seal member 5 which is integrally formed with the installation base member 1 and makes an elastic contact with an open-close member such as a door positioned in opposition to the automobile body, and a lip member 6.

The installation base member 1 is composed of a bottom wall portion 11 and side wall portions 12, 13 each of which extends from a corresponding end edge of the bottom wall portion 11, thereby forming a groove portion 10 having a roughly U shape in section. Further, there is formed a holding lip 2 inside the groove portion 10, which functions as a holding member when mounting the installation base member 1 on the opening edge of the automobile body.

Theses members are made of rubber material such as EPDM (Ethylene Propylene Diene Monomer).

Further, the installation base member 1 embeds a plastic-made insert 4 such as thermoplastic resin in order to maintain rigidity of the installation base member 1.

It should be noted that the weather strips for an automobile are varied in structure, therefore, the embodiment of the invention is applicable to a structure which does not comprise the hollow seal portion 5 or the lip portion 6.

One end portion of a lid member 3 is connected to the end portion of the side wall portion 12. The lid member 3 is formed into an appropriate width to cover the opening of the groove portion 10.

Further, the other end portion of the lid member 3 is not connected to any portion and is placed in a position which does not interfere a manufacturing tool 8 used in a holding lip manufacturing process 102 tol be performed later.

It is preferable to form the connecting portion of the lid member 3 with the side wall portions 12 thinner than the neighboring portions.

Figure 2:
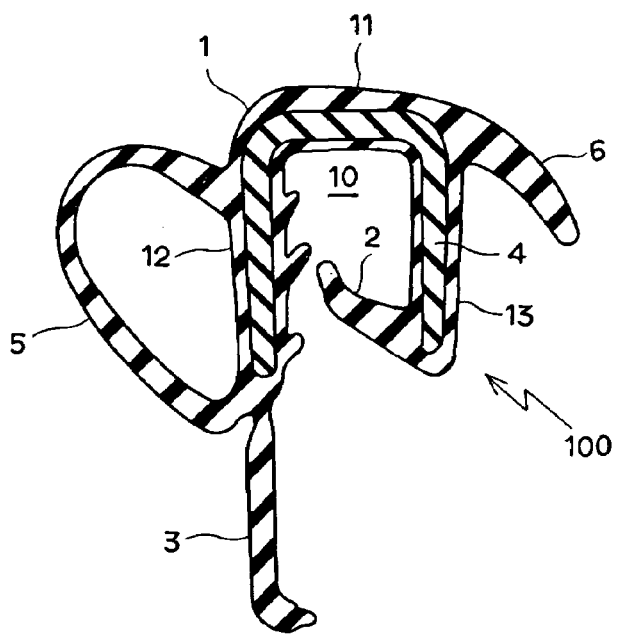
FIG. 2 is a sectional view showing a weather strip for an automobile in an extrusion-molding process.

As described above, the extrusion-molding of the weather strip 100 is performed in the extrusion-molding process 101 shown in the sectional view in FIG. 2.

Figure 3:
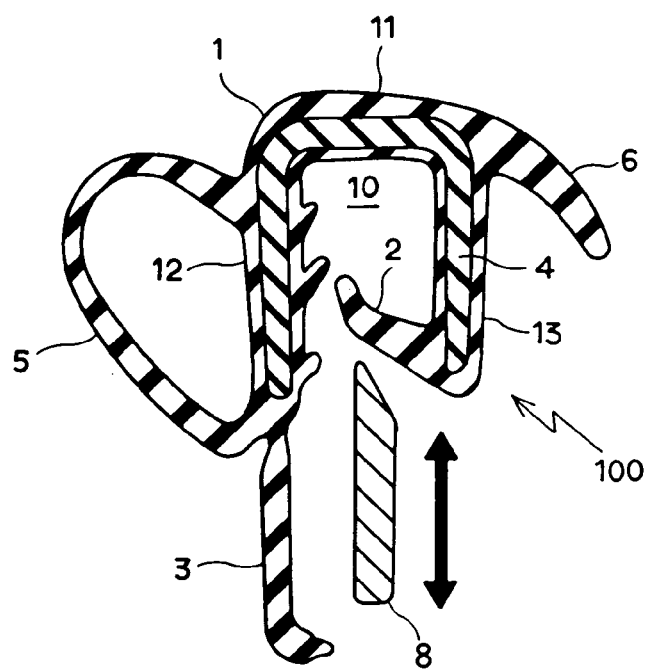
FIG. 3 is a sectional view showing a weather strip for an automobile in a holding lip manufacturing process.

Referring to FIG. 3, the holding lip manufacturing process 102 will be described hereinafter.

In this holding lip manufacturing process 102, a holding lip 2 is processed with a manufacturing tool 8 after extrusion-molding the weather strip in the extrusion process 101.

As illustrated in FIG. 3, in the holding lip manufacturing process 102, the holding lip 2 is processed inserting the manufacturing tool 8 into a groove portion 10 of the extrusion-molded weather strip 100 through the opening, and then, for example, moving the manufacturing tool 8 in the upward and downward directions. As the lid member 3 is placed in the position that does not interfere the manufacturing tool 8, the manufacturing tool 8 and the lid member 3 do not come into contact with each other.

It should be noted that where thickness of a steel metal forming an opening edge of an automobile body is thick, the holding lip 2 is processed so as to reduce holding force thereof, whereas where the thickness of the steel metal is thin, the holding lip 2 is processed so as to increase the holding force thereof.

Insertion of the manufacturing tool 8 is performed on or near a mouthpiece which is used in the extrusion-molding.

The manufacturing tool 8 may be a tool that pushes the holding lip 2 toward a side of the side wall portion 13, or a tool like a cutter that cuts off the holding lip 2 to form the holding lip 2 into a desired shape.

Figure 4:
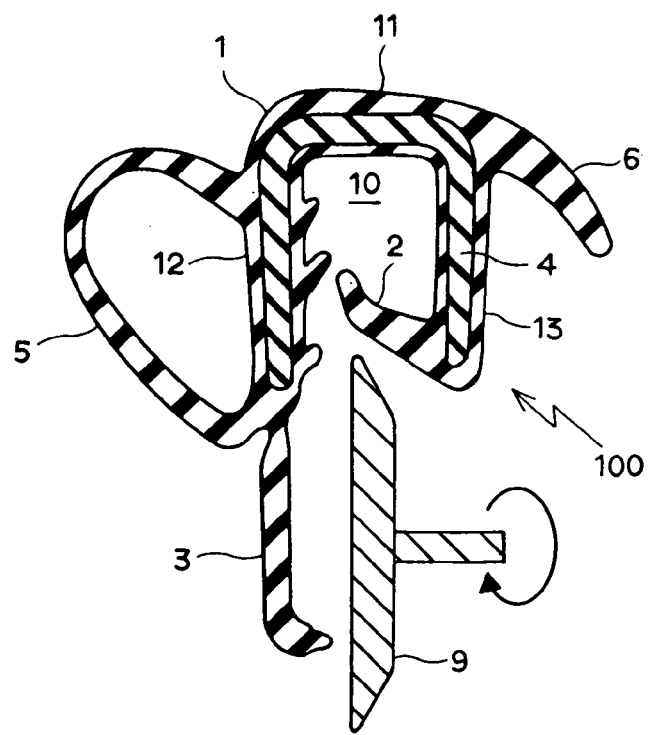
FIG. 4 is a sectional view showing a weather strip for an automobile in a holding lip manufacturing process.

Further, as illustrated in FIG. 4, the manufacturing tool 8 may also be a tool that rotates a disc-shaped tool 9.

Figure 5:
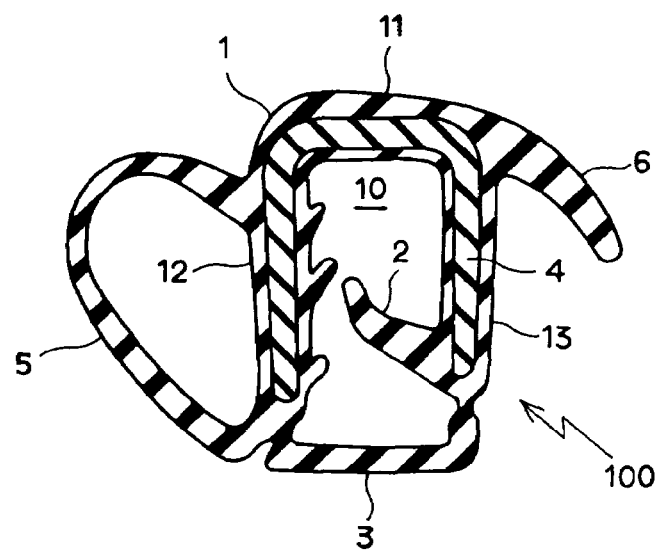
FIG. 5 is a sectional view showing a weather strip for an automobile in a lid closing process and a vulcanization process.

Referring to FIG. 5, the lid closing process 103 and the vulcanization process 104 will be described.

In the lid closing process 103, the opening of the groove portion 10 is covered with the lid member 3 in order to improve the rigidity of the weather strip 100 having holding lip 2 processed in the holding lip manufacturing process 102.

The process is performed by connecting the other side of the end portion of the lid member 3 (the end portion opposing to the end portion connected to the side wall portion 12) to an end portion of the side wall portion 13.

In this process, the weather strip 100 is still in an unvulcanized state because the weather strip 100 is continuously conveyed after the extrusion-molding process 101 and the holding lip manufacturing process 102. Therefore, merely by pressure-bonding the end portion of the lid member 3 and the end portion of the side wall portion 13 passing the weather strip 100 through a forming roller, the lid member 3 and the side wall portion 13 can easily be connected.

It should be noted that it is preferable to form the connecting portion of the lid member 3 with the side wall portion 13 thinner than the neighboring portions as the connecting portion of the lid member 3 with the side wall portion 12.

By covering the opening of the groove portion 10 with the lid member 3, the side wall portion 12 and the side wall portion 13 are connected so that the rigidity of the weather strip 100 increases.

Keeping this structural condition, the weather strip 100 is vulcanized in a forthcoming vulcanization process 104.

Figure 6:
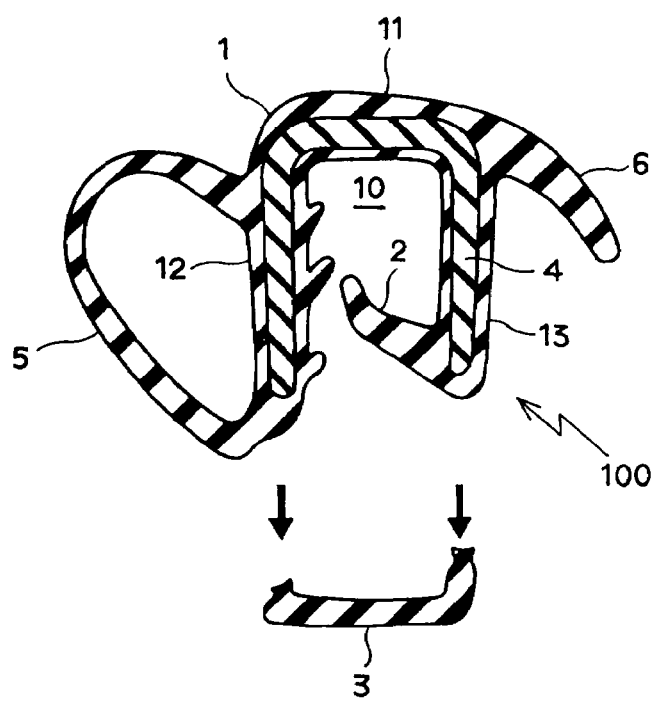
FIG. 6 is a sectional view showing a weather strip for an automobile in a lid removing process.
Figure 7:
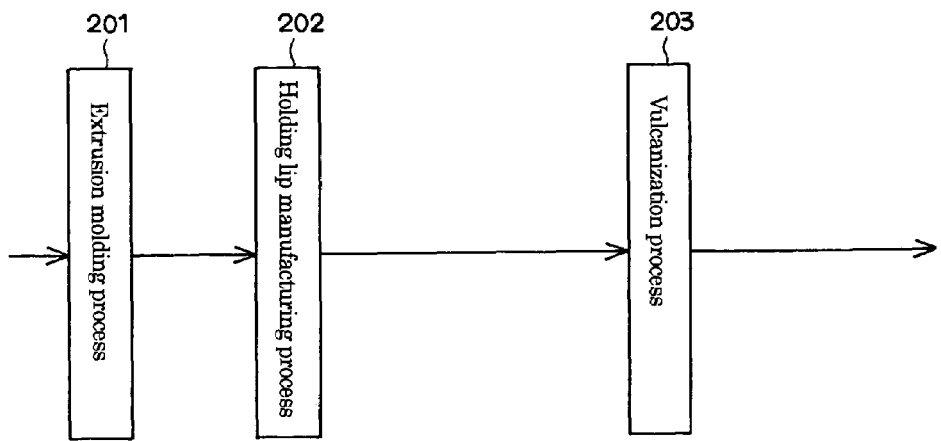
FIG. 7 is a flow chart showing a production method of a weather strip for an automobile according to a prior example.
Figure 8:
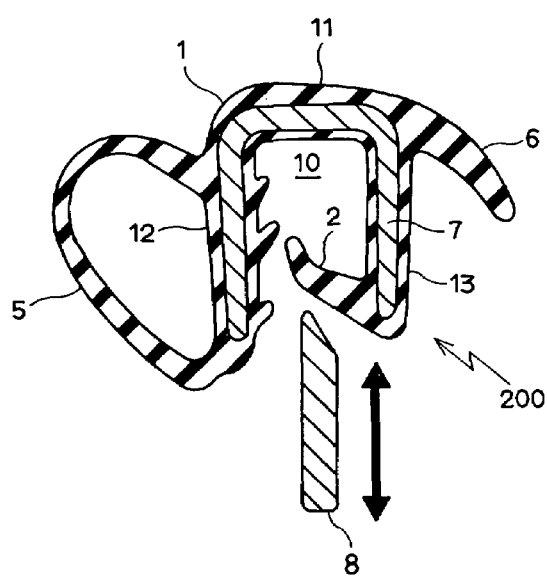
FIG. 8 is a sectional view showing a weather strip for an automobile according to a prior example.

Referring to FIG. 6, the lid removing process 105 will be described.

In the lid removing process 105, the lid member 3 which is unneeded is removed in order to make the weather strip 100 strengthened in the vulcanization process 104 a final product.

As illustrated in FIG. 6, the lid member 3 is removed by cutting off the lid member 3 from the side wall portions 12, 13 at the connecting portions.

The removing operation can be performed by way of cutting off with a cutter or tearing off with human hand.

Based on the above-described processes, the weather strip 100 is produced.

According to the embodiment of the production method of the weather strip for an automobile, in the extrusion-molding process 101 wherein whole the weather strip 100 is integrally extrusion-molded, one end portion of the lid member 3 is connected to the end portion of the side wall portion 12 while the other end portion is left unconnected, so that the opening of the groove portion 10 after extrusion-molding is not closed by the lid member 3. Therefore, in the holding lip manufacturing process 102, the lid member 3 does not interfere the process, so that the holding lip 2 thus extrusion-molded can be processed by inserting the manufacturing tool 8 through the opening of the groove portion 10.

Further, in the lid closing process 103 performed after the holding lip manufacturing process 102, the other end portion of the lid member 3 (the end portion opposing to the end portion connected to the side wall portion 12) is connected to the end portion of the side wall portion 13 to cover the opening of the groove portion 10, so that the rigidity of the weather strip 100 can be improved. Therefore, the weather strip 100 is prevented from being deformed in the vulcanization process 104.

Further, in the lid removing process 105, a desired weather strip 100 can be produced by removing the lid member 3 from both side wall portions 12, 13.

Moreover, by forming the connecting portions of the lid member 3 with the side wall portions 12, 13 thin-walled, the lid member 3 can easily be removed from the side wall portions 12, 13 in the lid removing process 105, so that workability improves when the lid member 3 is torn off by hand.

In the embodiment, the lid member 3 is formed into an appropriate width to cover the opening of the groove portion 10, and each end portion of the lid member 3 is connected to the corresponding end portions of the side wall portions 12, 13. However, the embodiment of the invention is not limited to such structure, that is, the width of the lid member 3 can be formed in any length wider than the opening of the groove portion 10. In such case, any one portion, not limited to the end portion, of the lid member 3 can be connected to the end portion of the side wall portion 12, while connecting another portion of the lid member 3 to the end portion of the side wall portion 13, thereby covering the opening of the groove portion 10.

Further, in the embodiment, one end portion of the lid member 3 is connected to the end portion of the side wall portion 12 in the extrusion-molding process 101 while the other end portion of the lid member 3 is connected to the end portion of the side wall portion 13 in the lid closing process 103. In stead of said process, one end portion of the lid member 3 can be connected to the end portion of the side wall portion 13 in the extrusion-molding process 101 while connecting the other end portion of the lid member 3 to the end portion of the side wall portion 12 in the lid closing process 103.

I claim:

1. A method of producing a weather strip for an automobile, wherein the weather strip comprises (i) a rubber installation base member which has a plastic insert embedded therein, and which comprises a bottom wall portion and side wall portions extending from end edges of said bottom wall portion, respectively, to form a groove portion which is roughly U-shaped in section, and (ii) a holding lip provided inside said groove portion, said method comprising:

integrally extrusion-molding the whole weather strip such that a first side of a lid member is connected to an end portion of a first one of said side wall portions, and such that a second side of said lid member is not connected to an end portion of a second one of said side wall portions, said lid member being longer than an opening of said groove portion;

processing said holding lip of the extrusion-molded weather strip by inserting a manufacturing tool in said groove portion through said opening;

connecting the second side of said lid member to the end portion of the second side wall portion to cover said opening of said groove portion with said lid member;

vulcanizing said weather strip; and removing said lid member from said side wall portions.

2. The method according to claim 1, wherein connecting portions of said lid member where said lid member is connected with said side wall portions are thinner than another portion of said lid member.

* * * * *